May 11, 1926.
E. SCHOTT ET AL
1,584,661
DEVICE FOR FUSING GLASS EXTENSIONS ONTO GLASS VESSELS
Filed Oct. 22, 1925
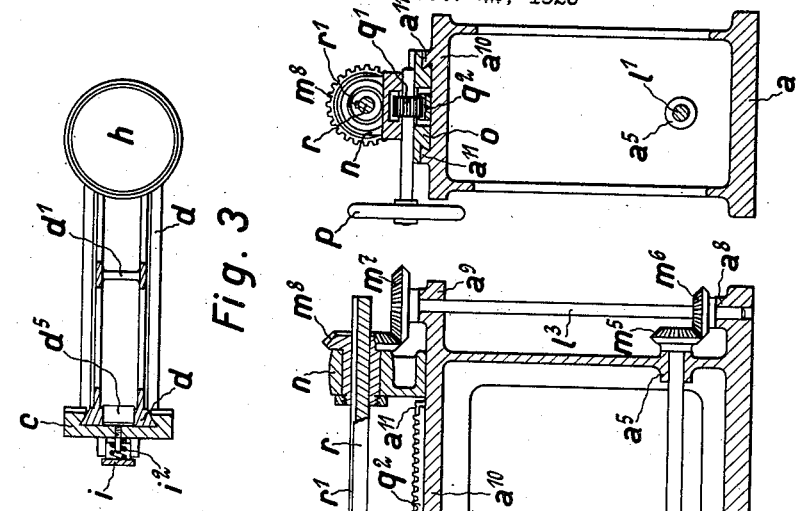
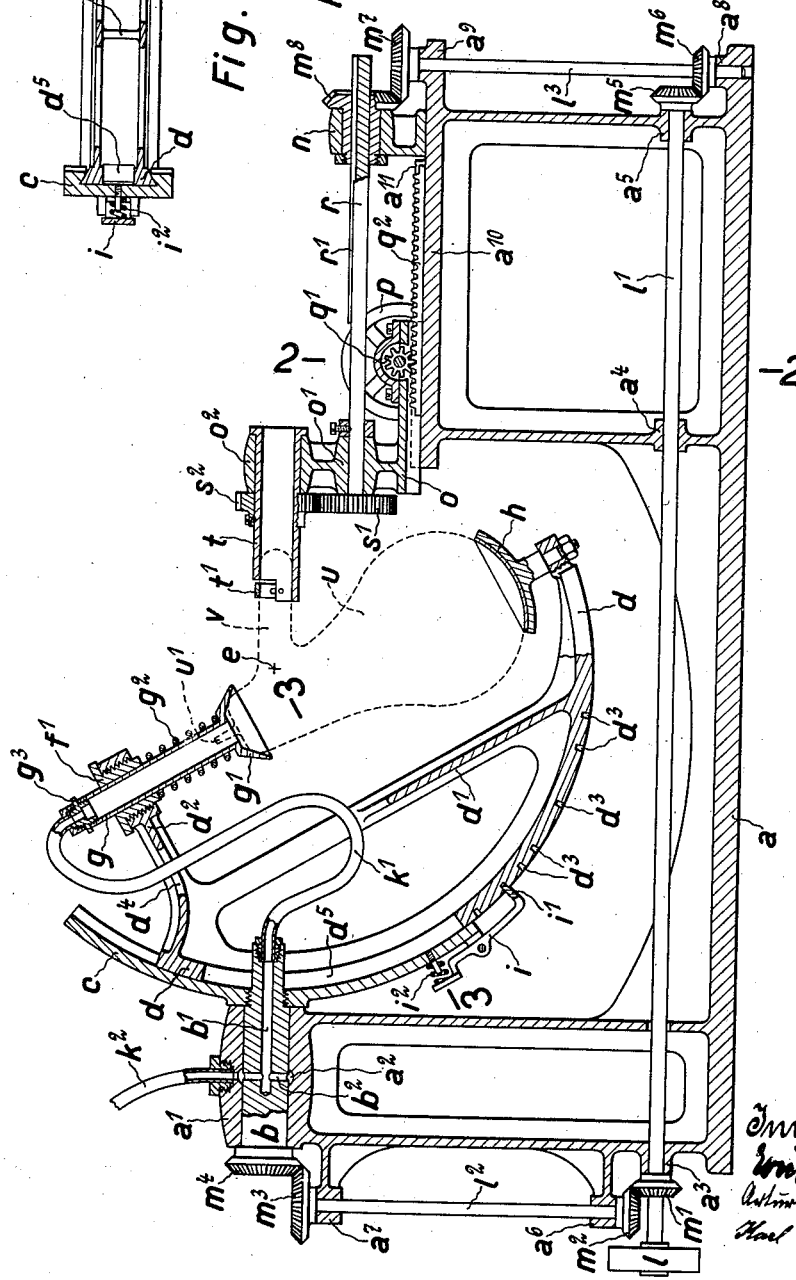

Patented May 11, 1926.

1,584,661

UNITED STATES PATENT OFFICE.

ERICH SCHOTT, ARTHUR HASENSTEIN, AND KARL DITSCHER, OF JENA, GERMANY, ASSIGNORS TO FIRM OF JENAER GLASWERK SCHOTT AND GEN, OF JENA, GERMANY.

DEVICE FOR FUSING GLASS EXTENSIONS ONTO GLASS VESSELS.

Application filed October 22, 1925. Serial No. 64,195.

The fusing of glass extensions onto glass vessels (e. g. of the exciting tubes onto glass rectifier-vessels) has hitherto been done by hand. Thereby it was necessary to continually rotate during the working process the glass bodies to be provided with the extensions in order to prevent the glass softened at the fusing place from flowing off towards one side and in order that the thickness of the wall of the extension became uniform over the whole extent of the fusing place. However, it was difficult to handle the glass bodies in a heated state, particularly if the axis upon which the rotations were to be based did not coincide with the longitudinal axis, and even with skilled workmen the production of an uninterrupted number of faultless work pieces was an exception. According to the invention it is generally possible to exclude the production of faulty and therefore useless work pieces by using a device in which the glass bodies to be provided with extensions rotate about an axis deviating from their longitudinal axis, whereby they are held by gripping device, participating in the rotary motion and admitting of displacing the glass bodies about an axis intersecting the axis of rotation. If the extensions, as is the case in the example, are to be fused on in such a way that their longitudinal axis obliquely intersects the glass body, the device is suitably used in such a manner that the extensions are first perpendicularly fused on and subsequently set obliquely with continuous heating of the fusing place during the uninterrupted rotation of the whole work piece about the longitudinal axis of the extensions by displacing them about an axis, intersecting the axis of rotation of the glass bodies and traversing the fusing place.

Frequently it is of importance to adhere very exactly to the angle at which the extensions are to be fused onto the glass bodies. A simple means for securing the glass bodies during the respective part of the working process in the position embracing the prescribed angle with its longitudinal axis consists in this that the displaceable part of the gripping device is secured in the positions, requisite for the different working processes, by a locking mechanism. The latter may be of a different kind according to the requirements of the particular case. For instance, if some definite angles often recur for the axial position of the extensions it is suitable to choose a ratchet, the tooth gaps of which correspond to the angular positions coming in question. On the other hand, friction or friction-ratchet gears are to be used if it be desired to adjust the angles as required in each particular case.

The position of the glass bodies during the rotation having thus been fixed, it is advisable to also guide positively the extensions to be fused on during the working process. Thereby it is possible to use to advantage an arrangement with which also the extension to be fused on at any one time is held in a gripping device, viz, in such a way as to rotate about its longitudinal axis lying in the axis of rotation of the glass body, while one of the two gripping devices is displaceable in the direction of the axis of rotation. It will generally be preferable to dispose the gripping device, holding the extension, displaceable, but the gripping device, carrying the glass body, rigidly fixable. Thereby it must only be seen to that both partial work pieces from the moment of the fusing until the hardening of the fusing place rotate at exactly the same angular speed. This takes place in the simplest way by so coupling the two gripping devices that the glass body and the extension to be fused on rotate in the same direction at the same angular speed.

The accompanying drawing shows an example of the invention. Fig. 1 is a longitudinal section of the device in an elevation, Fig. 2 a section on the line 2—2 of Fig. 1 in a side view, Fig. 3 a partial section on the line 3—3 of Fig. 1 in a plan.

Onto a base-plate $a$ is cast a bearing $a^1$ in which rests a neck journal $b$. The latter carries a circular-arched carriage guide $c$ in which a carriage is guided in such a way as to be able to carry out circular motions about the centre of curvature $e$ of the carriage guide $c$, lying in the extension of the axis of the journal $b$. The carriage $d$ is reinforced by means of cross slides $d^1$ and provided at its upper end with an arm $d^2$ in which a guide bush $f^1$ is screwed; a tube $g$, which is displaceable in this bush $f^1$ and provided with a conical hood $g^1$, is under the action of a spring $g^2$, whereby a nut serves as a stop. The carriage $d$ carries at its lower end a bowl $h$ and is provided with grooves $d^3$ in which a pawl $i$, rotatably disposed on the carriage guide $c$, engages with its tooth $i^1$ and is kept in mesh by a spring $i^2$. For introducing compressed air into the tube $g$ serves an air-tube $k^1$, connecting the boring of the nut $g^3$ with a longitudinal boring $b^1$ of the journal $b$, which is, on its part, connected by a cross-boring $b^2$ to a ring $a^2$, recessed in the bearing $a^1$ and by means of this ring to an air-tube $k^2$. In order to lead through the air-tube $b^1$, $k^1$, the carriage $d$ is provided with recesses $d^4$, $d^5$.

For actuating the journal $b$ serve a pulley $l$, fixed on a shaft $l^1$ supported in three bearing $a^3$, $a^4$ and $a^5$, and two pairs of bevel wheels $m^1$, $m^2$ and $m^3$, $m^4$. While the bevel wheel $m^1$ is fixed on the shaft $l^1$ and the bevel wheel $m^2$ and $m^3$ on a shaft $l^2$ guided perpendicular to the shaft $l^1$ in two bearings $a^6$ and $a^7$, the bevel wheel $m^4$ is connected to the journal $b$. The shaft $l^1$ simultaneously transmits its motion by means of a pair of bevel wheels $m^5$, $m^6$ to a second shaft $l^3$, guided perpendicular thereto in two bearings $a^8$ and $a^9$, and the shaft $l^3$ again by means of a bevel wheel $m^7$ to a bevel wheel $m^8$ which is rotatable in a bearing $n$. The latter is fixed on a table-top $a^{10}$, carrying two guide-bars $a^{11}$ between which a carriage $o$ is displaceable from a hand wheel $p$ by means of a toothed wheel $q^1$, supported in the carriage $o$ and a rack $q^2$ provided on the table-top $a^{10}$ in the axial direction of a shaft $r$ provided with a key $r^1$. The shaft $r$ which is supported in a bearing $o^1$ on the carriage $o$ and provided with a spur wheel $s^1$, is actuated from the bevel wheel $m^8$. It serves for actuating a tension sleeve $t$ which is rotatable in a bearing $o^2$ and provided with a spur wheel $s^2$ as well as a stud-bow $t^1$. The ratio of gearing of all coacting pairs of toothed wheels is 1:1.

Fig. 1 of the drawing shows by dash lines a pear-shaped glass body $u$ onto which an extension tube $v$ is fused at a certain definite angle. In order to carry out with the device the fusing together of such work pieces it is necessary to put the glass body $u$ provided with an insufflating aperture $u^1$ between the bowl $h$ and the conical hood $g^1$ as well as the prepared tube $v$ by means of the stud-bow $t^1$ into the tension sleeve $t$. The glass body $u$ is thereby so adjusted by means of the locking mechanism, formed by the pawl $i$ and the grooves $d^3$, that a generating line of its surface perpendicularly intersects the axis of rotation of the device in the fusing place, thus, e. g. by the insertion of the tooth $i^1$ into the groove $d^3$, being the farthest on the right-hand side.

The device having been actuated from the pulley $l$, it is necessary to heat the fusing place (for instance by means of gas blow-pipes, manually operated and not shown in the drawing) until by blowing air into the air-tube $k^2$ it is possible to obtain an elevation of the surface, the wall of which will burst on the blowing-in of air being continued. The aperture thus obtained having been properly enlarged, the extension tube $v$, while being continually heated, is brought near the fusing place by displacing the carriage $o$ with the aid of the hand wheel $p$. As soon as the bodies $u$ and $v$ are in contact with one another, they adhere to each other. Thereupon, while the fusing place is further continually heated, the carriage $d$ in the guide $c$ is brought into the position, prescribed for the extension tube $v$, in which the tooth $i^1$ engages in another groove $d^3$. Finally, after the hardening of the fusing place end of the tube $v$, exceeding a prescribed length, may be fused off.

We claim:

1. A device for fusing glass extensions onto glass vessels, glass tubes and the like, containing a base plate, a guide rotatably supported on this base plate, and a gripping device fixed on this guide in such a way as to be displaceable relatively to it in a plane, containing the axis of rotation of the said guide.

2. A device according to claim 1, containing a locking mechanism adapted to fix the gripping device on the guide in different positions.

3. A device for fusing glass extensions onto glass vessels, glass tubes and the like, containing a base plate, a gripping device rotatably supported on this base plate, this gripping device being adapted to receive the vessel to be worked in such a way that its longitudinal axis intersects the axis of rotation of the said gripping device, and a second gripping device supported on the base plate rotatable about the same axis as the first gripping device and adapted to receive the extension to be fused on, at least one of the said two gripping devices being displaceable relatively to the base plate in the direction of the said axis of rotation.

4. A device for fusing glass extensions onto glass vessels, glass tubes and the like, containing a base plate, a gripping device rotatably supported on this base plate, this gripping device being adapted to receive the vessel to be worked in such a way that its longitudinal axis intersects the axis of rotation of the said gripping device, a second gripping device supported on the base plate rotatable about the same axis as the first gripping device and adapted to receive the extension to be fused on, at least one of the said two gripping devices being displaceable relatively to the base plate in the direction of the said axis of rotation, and means for coupling the two gripping devices, so that both can only rotate in the same direction and at the same angular speed.

DR. ERICH SCHOTT.
ARTHUR HASENSTEIN.
KARL DITSCHER.